United States Patent
Ehrlich et al.

(10) Patent No.: US 6,171,207 B1
(45) Date of Patent: Jan. 9, 2001

(54) TRANSMISSION HAVING PRESSURE-OPERATED ADJUSTING MEANS

(75) Inventors: Matthias Ehrlich, Bühl; Rainer Eidloth, Bamberg, both of (DE)

(73) Assignee: LuK Getriebe-Systeme GmbH, Buhl/Baden (DE)

(*) Notice: Under 35 U.S.C. 154(b), the term of this patent shall be extended for 0 days.

(21) Appl. No.: 09/218,760

(22) Filed: Dec. 22, 1998

(30) Foreign Application Priority Data

Dec. 22, 1997 (DE) .............................................. 197 57 174

(51) Int. Cl.[7] .......................................................... F16H 9/18
(52) U.S. Cl. .................................................. 474/18; 474/28
(58) Field of Search ................................ 474/1, 2, 8, 17, 474/18, 28, 46, 43, 45, 69, 70, 71, 72, 11, 12, 91; 184/6.5, 6.12; 384/389

(56) References Cited

U.S. PATENT DOCUMENTS

| | | | |
|---|---|---|---|
| 3,842,637 | * 10/1974 | Wilson | 74/230.17 M |
| 3,958,836 | * 5/1976 | Brown et al. | 305/14 |
| 4,345,797 | * 8/1982 | Ballheimer | 308/122 |
| 4,622,933 | * 11/1986 | Fukuo et al. | 123/195 R |
| 4,930,601 | * 6/1990 | Leidecker et al. | 184/6.12 |
| 4,987,974 | * 1/1991 | Crouch | 184/6.12 |
| 5,094,652 | * 3/1992 | Sakakibara et al. | 474/46 |
| 5,295,915 | 3/1994 | Friedmann | 474/18 |
| 5,427,578 | * 6/1995 | Iijima | 474/46 |
| 5,456,129 | * 10/1995 | Tane et al. | 74/467 |
| 5,474,152 | * 12/1995 | Wilkinson et al. | 184/6.12 |
| 5,667,036 | * 9/1997 | Mueller et al. | 184/6.12 |
| 6,012,998 | * 1/2000 | Schutz et al. | 474/43 |
| 6,015,359 | * 1/2000 | Kunii | 474/91 |

\* cited by examiner

*Primary Examiner*—David Fenstermacher
(74) *Attorney, Agent, or Firm*—Darby & Darby

(57) ABSTRACT

In a transmission having shaft-mounted components operated by a pressurized medium or fluid, the fluid is supplied to the components using an at least partially hollow shaft. A hollow tube within the bore of the shaft carries the fluid. The tube may be divided into separate passageways so as to control flow of fluid to selected components and isolate components from each other. The fluid pressure in the components may be torque-dependently modulated by a torque sensor.

10 Claims, 6 Drawing Sheets

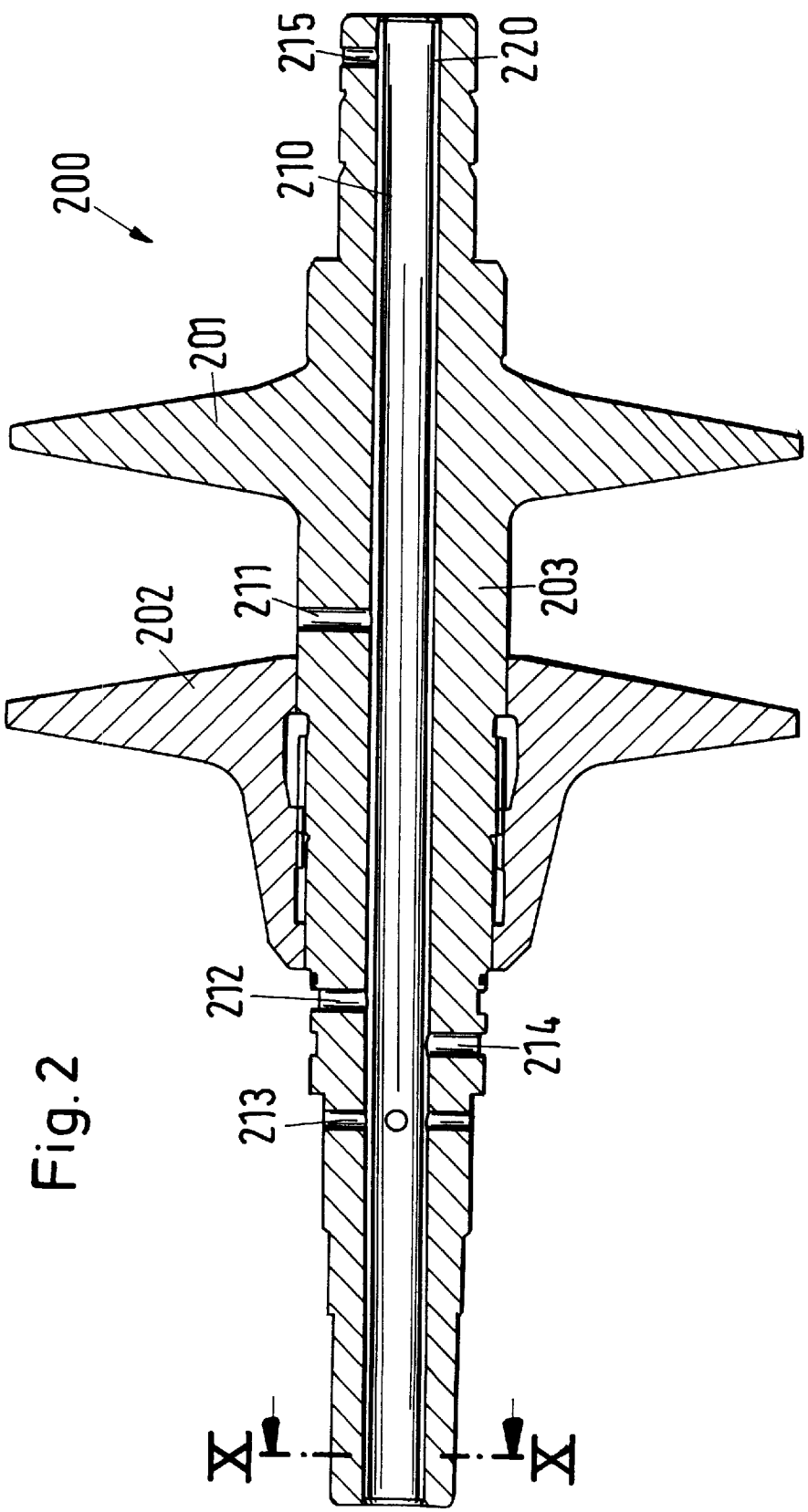

TRANSMISSION HAVING PRESSURE-OPERATED ADJUSTING MEANS

BACKGROUND OF THE INVENTION

1. Field of the Invention

The invention relates to a transmission, sub as a continuously variable speed cone pulley transmission.

2. Description of Related Art

A transmission typically is disposed in a motor vehicle in the power flow between a driving unit and at least one wheel, with an input shaft and an output shaft, a starting element and an element for reversing the direction of rotation and a first set of conical flanges disposed on a first shaft and having an axially fixed and an axially suitable conical flange as well as a second set of conical flanges disposed on a second shaft and baving an axially fixed and an axially suitable conical flange and a wrapping means for the transmission of torque between the first and second sets of conical flanges and, if necessary, a torque sensor, at least the axially suitable conical flanges comprising adjusting means for the application of pressure.

In the aforementioned transmissions, the supplying of a pressurized medium is ensured in bat, there are provided in the shafts of the transmission discrete axially parallel neighboring holes in the form of longitudinal bores which communicate with radially outwardly extending bores. Such parallel bores in the form of longitudinally extending holes which are provided in the shafts can be formed only at a relatively high cost.

SUMMARY TO THE INVENTION

An object underlying the present invention was to provide a transmission of the above outlined character which can be produced in a relatively simple manner as concerns its construction and manufacturing cost. Furthermore, conventional transmissions should be improved.

In accordance with the invention, this is accomplished in that, for the purpose of supplying pressurized medium to at least one of the adjusting means, at least one of the shafts is provided with a cavity extending along a portion of the axial length of the shaft, this cavity receiving a hollow tube which is provided with axially extending webs dividing the cross section of the tube into various chambers which extend in the axial direction.

It is of particular advantage if the adjusting means can receive pressurized medium by way of substantially radially extending bores provided in the at least one shaft and extending through the wall of the hollow tube.

It is equally advantageous if the hollow tube is subdivided into at least two chambers by at least one web which extends in the axial direction. In accordance with an advantageous embodiment of the invention, there are provided two, in another embodiment three, in a further embodiment four, and furthermore in an additional embodiment five or more chambers which are arranged essentially parallel to each other in the axial direction and are separated from each other by webs. In this connection, it can be of advantage if the webs extend radially outwardly from the central point or from the axis of the shaft and, if necessary, meet and sealingly engage and, if necessary, are connected to each other at the center. It is desirable that the radially outer portions of the webs be sealingly connected to the hollow tube.

Furthermore, in accordance with an additional embodiment of the invention, it may be desirable if the hollow tube is non-rotatably connected to the shaft and at least one of its axial end portions is rotatably journalled relative to an element which is secured to the housing.

It is equally advantageous if the at least one axial end portion of the hollow tube is provided with a connection which is essentially fluidtight when the hollow tube and the element which is affixed to the housing rotate relative to each other.

Furthermore, it is of advantage if the hollow tube is mounted against rotation relative to the housing and the shaft is journalled for rotation relative to the hollow tube.

In accordance with a further embodiment, it is equally of advantage if the peripheral coat of the hollow tube is provided with at least some regions which are sealed by seals and which are in fluid-conveying communication with discrete channels of the hollow tube by way of bores.

BRIEF DESCRIPTION OF THE DRAWINGS

The invention will be explained in greater detail with reference to the embodiments which are illustrated in FIGS. 1 to 4. There is shown in:

FIG. 1 is a schematic view of a transmission 1, such as a continuously variable speed cone pulley transmission, which is installed in a motor vehicle in a power flow downstream of a driving unit, such as a motor, and which is followed by at least one driven wheel of the motor vehicle.

The transmission 1 comprises a housing 99 which is preferably made of a massive or foamed material. The utilized material is preferably aluminum, magnesium or another light metal. It is also possible to fill the cavities of the housing 99 with such foamed material. In accordance with a further embodiment, it is equally possible to utilize such foamed material as a coating for the housing. This exhibits the novel advantage that oscillations of the housing are damped to thus achieve an insulation of noise. In accordance with the invention, such insulation ensures an increased comfort due to a reduction of noise within and/or outside of the vehicle while at the same time reducing the manufacturing cost.

Figure 1:
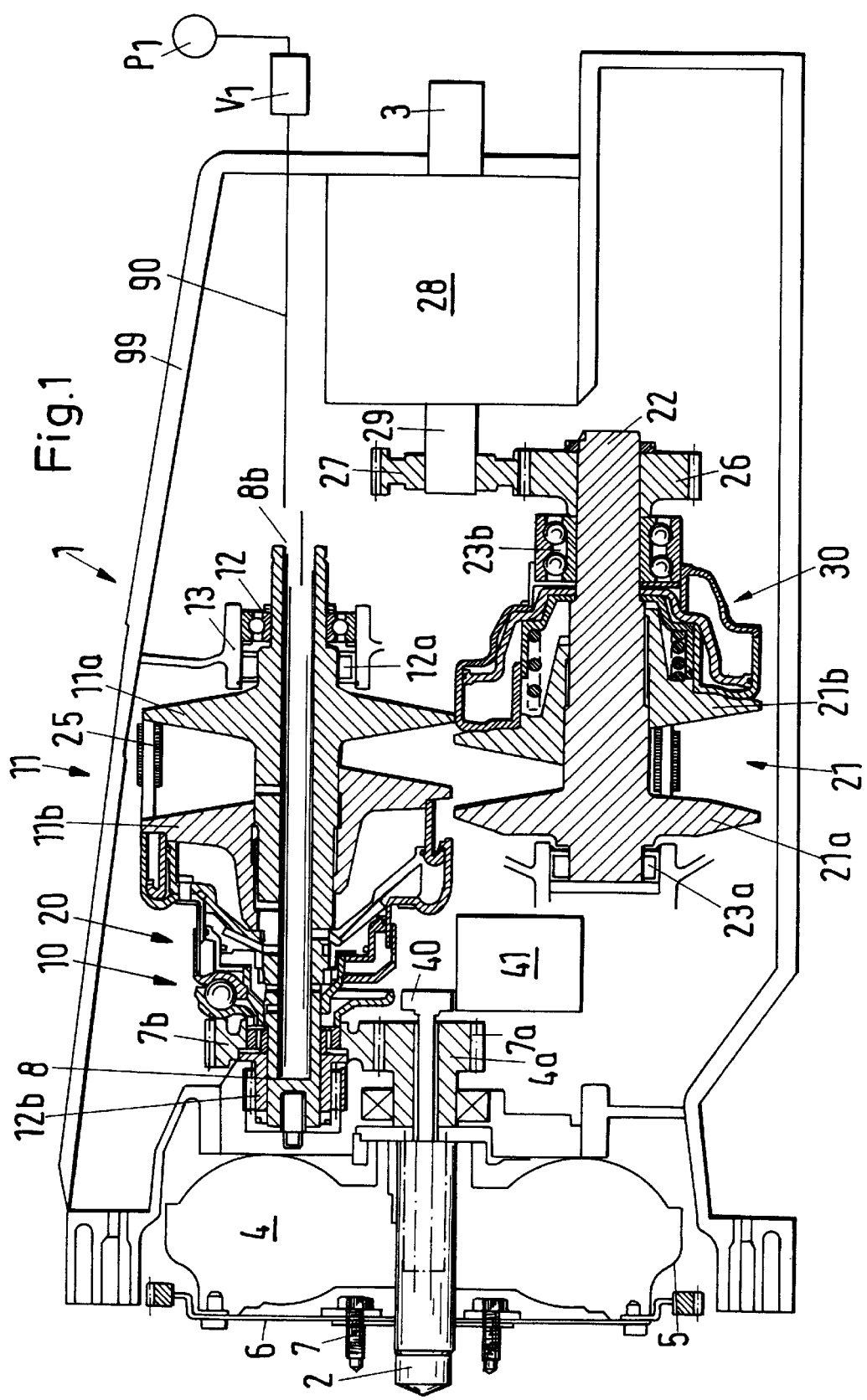
FIG. 1 shows a schematic representation of a transmission according to an embodiment of the invention wherein certain components are shown in cross-section, FIG. 1a a sectional view of a portion of a continuously variable speed cone pulley transmission according to an embodiment of the invention.

The transmission 1 comprises an input shaft 2 which can be connected, for example, with the crankshaft of a driving unit, such as a motor or a combustion engine. The transmission 1 further comprises an output shaft 3 which is connectable with a downstream output shaft or cardan shaft. In the embodiment of FIG. 1, the input shaft 2 is mounted essentially in parallel with the output shaft 3, there being a slight offset between the shafts 2 and 3. The input shaft 2 is not mounted coaxially with the output shaft 3; however, such coaxial arrangement might be of advantage in a further embodiment.

The input shaft 2 is followed in the power flow by a starting element 4. In this embodiment, the starting element 4 constitutes a hydrokinetic torque converter 5 with or without a lockup clutch the outline of which can be seen in the drawing. The input shaft 2 is operatively connected with the starting element 4, the input shaft 2 being connected with the housing of the torque converter and the converter being connected with the crankshaft by way of a flexible diaphragm 6 and fastener means 7 in the form of screws.

The starting element 4 can comprise a torsional vibration damper, such as for example a wet- or dry-running damper which can employ damping spring- and frictional damping units as well as, if necessary, a flywheel or a twin-mass flywheel with means for damping torsional vibrations between those elements of the primary and secondary masses which are rotatable relative to each other.

As shown schematically in FIG. 1, the starting element can be provided with or it can operate without a converter lockup clutch, but it is equally possible to employ, in accordance with another embodiment, a dry- or wet-running clutch or a laminar clutch.

The output element 4a of the starting element 4 is connected with a gear 7a. The teeth of the gear 7a mesh with the teeth of a further gear 7b which is mounted for rotation about an axis 8.

The gear 7b is connected with a shaft 8b upon which is mounted a torque sensor 10 and a first set 11 of conical flanges. The torque sensor 10 is installed in the torque transmitting path between the shaft 8b and the first set 11 of conical flanges. The shaft 8b is offset relative to the input shaft 2.

The first set 11 of conical flanges comprises an axially fixed or stationary conical flange 11a which is fixedly secured to the shaft 8b or is of one piece therewith. The first set of conical flanges further comprises an axially shiftable conical flange 11b which is displaceable relative to the first conical flange 11a but is non-rotatably connected to the shaft 8b. Axial shifting of the conical flange 11b is regulated in response to the application of pressure by adjusting means 20, such as a piston-cylinder unit.

The shaft 8b of the first set 11 of conical flanges is carried by and journalled in an extension 13 of the housing 99 by means of at least one bearing 12, 12a, 12b, such as a rolling contact bearing or ball bearing or roller bearing. This results in a centering of the shaft in the axial and/or radial direction.

A second set 21 of conical flanges comprises an axially fixed conical flange 21a which is fixedly secured to a shaft 22 or is of one piece therewith. Furthermore, the second set 21 of conical flanges comprises an axially shiftable conical flange 21b which is displaceable relative to the first conical flange 21a but is non-rotatably secured to the shaft 22. Regulation of axial displacement of the conical flange 21b is effected in response to the application of pressure by adjusting means 30, such as piston-cylinder units. The shaft 22 of the second set 21 of conical flanges is carried by and journalled in extensions of the housing 99 by means of bearings 23a, 23b such as rolling contact bearings or ball bearings or roller bearings. This results in a centering of the shaft 22 in the axial and/or radial direction.

In order to transmit torque between the first set 11 of conical flanges and the second set 21 of conical flanges, there is provided a wrapping means 25 to be effective between the two sets of conical flanges. The application of pressure to the wrapping means between the respective conical flanges of a set of conical flanges ensures the transmission of torque between the wrapping means and the set of conical flanges. Axial displacement of the axially movable conical flanges effects an infinite variation of the ratio of the transmission.

The shaft 22 of the downstream set 21 of conical flanges is connected with a gear 26, and the teeth of the gear 26 mesh with the teeth of a further gear 27 to establish a driving connection therewith. The second gear 27 is followed by an element 28, via a shaft 29 for reversal of the direction of rotation, such as a set of planetary gears, the output shaft 3 of the transmission 1 being located downstream of such direction of rotation reversing element.

The shaft 4a drives, by way of an auxiliary drive including a gear 40, a pump 41 which serves to regulate the pressure of and to supply pressurized medium to adjusting means and for lubrication of the transmission.

In accordance with an embodiment of the invention, it is of advantage if the starting element 4 immediately follows the input shaft 2 of the transmission, as seen in the direction of power flow, the input of the starting element 4 being connected with the input shaft 2 and the output of the starting element 4 being coaxial with the input shaft 2. It can also be of advantage to provide a gearing between the outlet of the starting element and the torque sensor 10. In accordance with a further embodiment, it might be desirable that the outlet of the starting element 4 be directly connected to the torque sensor 10 without the interposition of a transmission stage or a gearing. Still further, it is advisable to provide the torque sensor 10 and the first set 11 of conical flanges coaxially on a shaft 8b. In accordance with a further embodiment, it might be advisable to install the second set 21 of conical flanges on a further shaft 22 which is connected with the direction of rotation reversing element 28 by a gearing 26, 27. The direction of rotation reversing element 28 is mounted coaxially with the output shaft 3 of the transmission 1.

In accordance with a further advantageous embodiment, it is of advantage if the arrangement of elements in the torque transmitting path is as follows:

the starting element 4 is located past the input shaft 2, the input of the starting element being connected with the input shaft 2 and the output of the starting element being coaxial with the input shaft 2, the torque sensor 10 is located past the starting element, the torque sensor 10 and the first set 11 of conical flanges are mounted coaxially on a shaft 8b, the second set 21 of conical flanges is mounted on a further shaft 22 which is followed by the direction of rotation reversing element 28, the direction of rotation reversing element 28 is mounted coaxially with the output shaft 3 of the transmission 1.

In accordance with a further embodiment, it is advisable that that the starting element 4 and the first set 11 of conical flanges be mounted coaxially with each other. In accordance with a further embodiment, it is equally advantageous if the starting element 4 and a shaft 8b of the first set 11 of conical flanges be offset relative to each other and the transmission of torque take place by way of a gearing 7a, 7b, such as for example a gearing with spur gears.

In accordance with a further inventive concept, it is advisable that the second set 21 of conical flanges be mounted coaxially with the output shaft 3. It is also of advantage to mount the second set 21 of conical flanges in such a way that they are offset relative to the output shaft 3 and the transmission of torque take place by way of a gearing 26, 27, such as a set of spur gears. It is of particular advantage if the axially shiftable conical flange 11b of the first set 11 of conical flanges is that conical flange which confronts the input shaft 2. Furthermore, in accordance with an additional embodiment, it can be of advantage if the axially shiftable conical flange 11b of the first set 11 of conical flanges is that conical flange which confronts the output shaft 3.

In accordance with a further embodiment, it is advisable that the axially shiftable conical flange 21b of the second set 21 of conical flanges is that conical flange which confronts the output shaft 3. In accordance with an advantageous embodiment of the invention, it is advisable that the shaft 8b for the first set 11 of conical flanges be disposed above the input shaft 2. In accordance with a further embodiment, it is desirable that the shaft 8b of the first set 11 of conical flanges be disposed below the input shaft 2. Furthermore, it is of advantage if the shaft 22 of the second set 21 of conical flanges is located above the input shaft 2. It is equally advantageous if the shaft 22 of the second set 21 of conical flanges is disposed below the input shaft 2. Such novel arrangements render it possible to achieve savings in space. Due to the advantageous layout, one can achieve savings in space if the shafts 8b, 22 of the first and second sets 11, 21 of conical flanges are disposed adjacent the input shaft 2, as seen in the axial direction. It is also of advantage if the shafts 8b, 22 of the first and second sets 11, 21 of conical flanges, as well as the input shaft 2 and the output shaft 3, are located in a common plane. In accordance with a further embodiment, it is especially advantageous and entails savings in space if the output shaft 3 is concentric with the input shaft 2. Furthermore, it is particularly advantageous and entails savings in space if the output shaft 3 to the input shaft 2 are coaxial with each other.

Figure 1A:
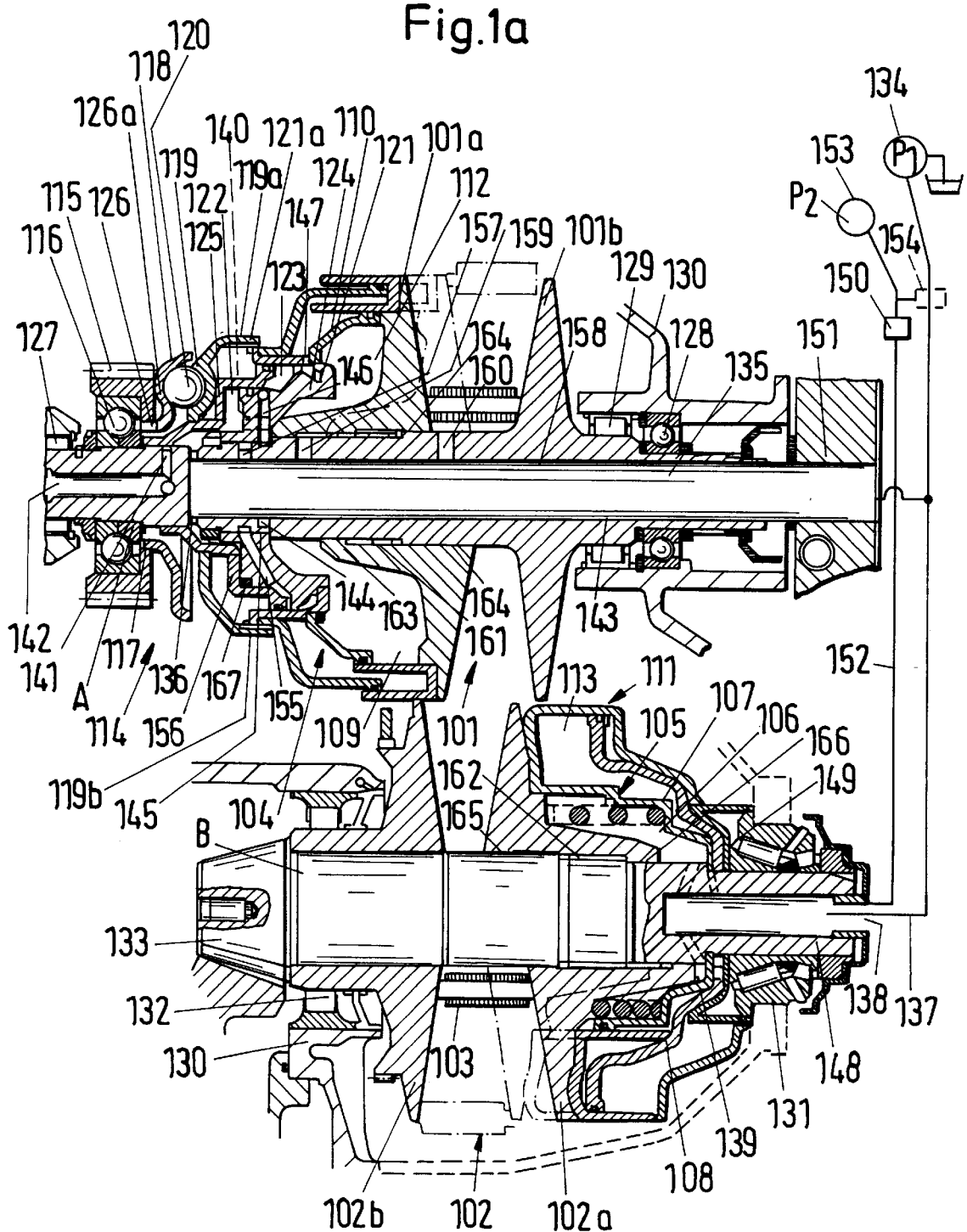
FIG. 1b is an enlarged view of a portion of the transmission shown in FIG. 1a, FIG. 2 shows a sectional view of a pair of conical flanges, according to an embodiment of the invention
Figure 1B:
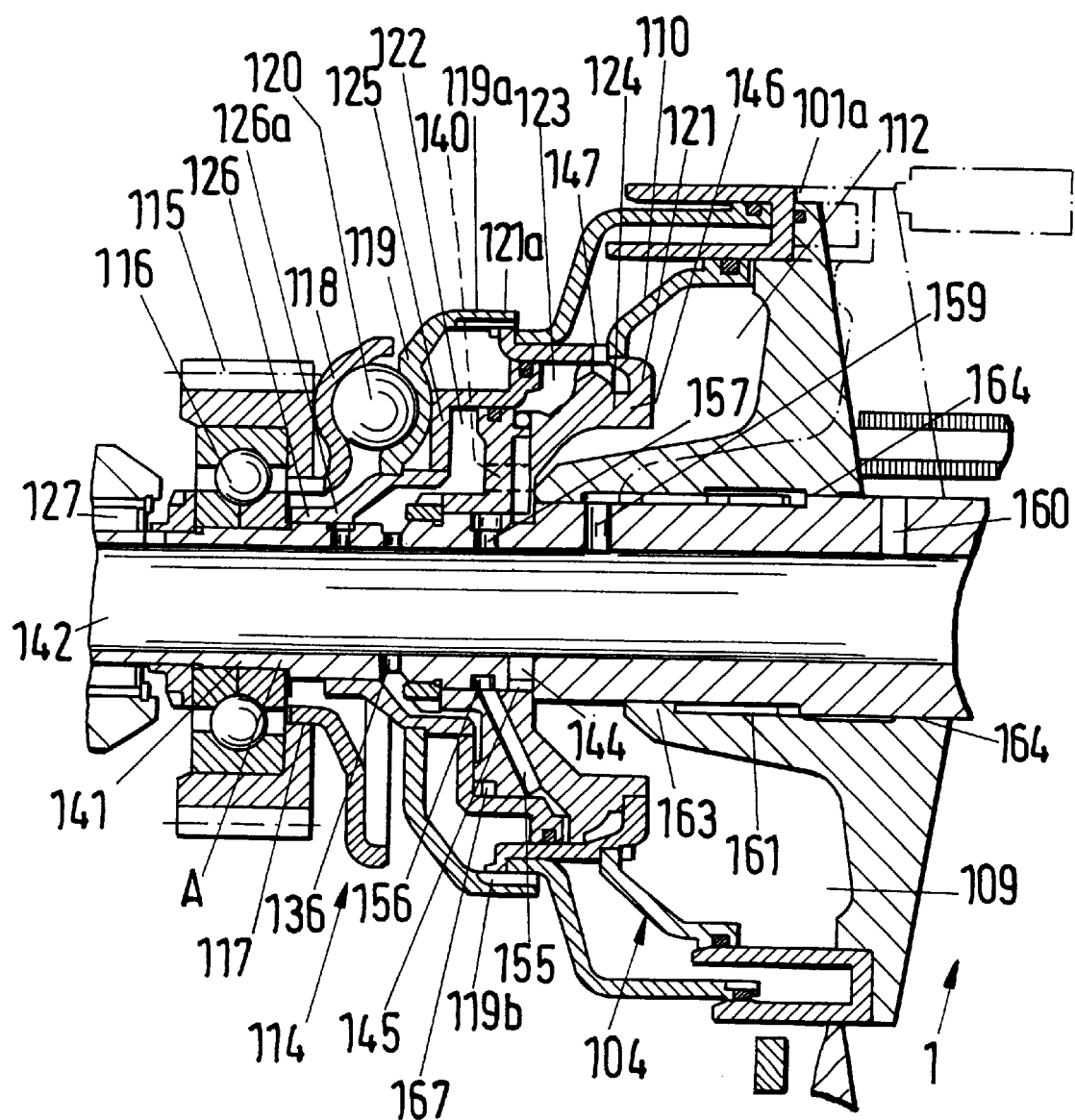

An embodiment of an infinitely variable cone pulley transmission, a portion of which is shown in FIGS. 1a and 1b, comprises a pair 101 of driving discs which are non-rotatably mounted on a drive shaft A, and a pair 102 of discs non-rotatably mounted on a driven shaft B. Each pair of discs has an axially movable disc 101a and 102a, such as a conical flange, and an axially fixed disc 101b and 102b, such as a conical flange. A wrapping means in the form of a chain or belt 103 is provided to transmit torque between the two pairs of discs.

The upper half of the illustration of the corresponding pair 101, 102 of discs shows those axial positions of the respective discs 101a, 101b and 102a, 102b which correspond to the minimum transmission ratio of the transmission to a lower speed (underdrive), whereas the lower halves of these illustrations show those positions of the cooperating discs 101a, 101b and 102a, 102b which correspond to the maximum transmission ratio to the higher speed (overdrive).

The pair 101 of discs can be axially stressed by an adjusting device, such as adjusting means 104, which constitutes a piston-cylinder unit. In a similar manner, the pair 102 of conical flanges are adapted to be stressed by an adjusting device, such as adjusting means 105 which can also constitute a pistoncylinder unit, to bear against the chain 103. In the plenum chamber 106 of the piston-cylinder unit 105, there is provided an energy storing device 107 which constitutes a coil spring and urges the axially movable disc 102a in a direction toward the axially fixed disc 102b. When the chain 103 is located downstream in the radially inner region of the pair 102 of discs, the stressing force furnished by the energy storing device 107 is greater than when the chain 103 is located in the larger-diameter region of the pair 102 of discs. Accordingly, this means that, as the ratio of the transmission increases toward the higher speed, the clamping force furnished by the energy storing device 107 also increases. On the one hand, the coil spring 107 is supported directly by the axially movable disc 102a and, on the other hand, it abuts a cupped structural element 108 which bounds the plenum chamber 106 and is rigidly connected to the driven shaft B.

The piston-cylinder units 104, 105 operate in parallel with additional piston-cylinder units 110, 111 which serve to change the ratio of the transmission. The plenum chambers 112, 113 of the piston-cylinder units 110, 111 can be alternately filled with or discharge a pressurized medium, depending upon the required transmission ratio. To this end, and depending upon the requirements, the plenum chambers 112, 113 can be connected either with a source of pressurized fluid, such as a pump, or with an evacuating conduit. Thus, in the event of a change of the transmission ratio, one of the plenum chambers 112, 113 is filled with a pressurized medium to thus increase its volume, whereas the other chamber 113, 112 is at least partially emptied, i.e., its volume is reduced. Such alternating increases of pressure in and partial evacuations of the plenum chambers 112, 113 can be effected by way of a suitable valve. As concerns the design and the mode of operation of such valve, references should be had in particular to the already mentioned state of art.

In order to generate an at least torque-dependent pressure, there is provided a torque sensor 114 the operation of which is based on a hydromechanical principle. The torque sensor transmits to the pair 101 of conical flanges that torque which is being transmitted thereto by a driver gear or driver pinion 115. The driver gear 115 is journalled on the drive shaft A by a roller bearing 116 and is non-rotatably connected with a disc cam 118, which forms part of the torque sensor 114 and is also supported in the axial direction by a form-locking connection or by a toothed portion 117. The torque sensor 114 comprises the axially fixed disc cam 118 and an axially shiftable disc cam 119. These disc cams comprise sloping ramps which flank spreading elements in the form of balls 120. The disc cam 119 is axially shiftable along but is non-rotatably secured to the drive shaft A. To this end, the disc cam 119 comprises a radially outer portion 119a which faces axially away from the balls 120 and carries teeth 119b cooperating with complementary teeth 121a of a component 121 which is secured to the drive shaft A as seen in the axial and circumferential directions. As concerns their mutual positions, the teeth 119b and the complementary teeth 121a are designed in such away that the components 119 and 121 can move axially relative to each other.

The parts of the torque sensor 114 bound two plenum chambers 122, 123. The plenum chamber 122 is defined by an annular component 124 which is rigidly connected to the drive shaft A, as well as by two portions or components 125, 126 which form part of or are carried by the disc cam 119. The annular plenum chamber 123 is located practically entirely radially outwardly of the annular plenum chamber 122 and is also axially offset relative to the latter. The second plenum chamber 123 is also bounded by the annular component 124 as well as by a sleeve-like component 121 which is fixedly secured to the component 124, and further by the annular structural member 125 which is rigidly connected to the disc cam 119, which acts as a piston and is axially movable.

The input shaft A, which carries the torque sensor 114 and the pair 101 of conical flanges, is journalled in a housing 130 by a needle bearing 127 at that side of the pair 101 of conical flanges which faces the torque sensor, and by a ball bearing 128 and a roller bearing 129 which is located at the side of the pair 101 of conical flanges facing away from the torque sensor and can take up axial stresses. The driven shaft B, which carries the output pair 102 of conical flanges, has an end portion adjacent the adjusting devices 105 and 111 and mounted in the housing 130 by a twin conical roller bearing 131 which can take up radial forces as well as axial forces developing in both axial directions, and the driven shaft is further mounted in a roller bearing 132 located at that side of the pair 102 of conical flanges which faces away from the adjusting devices 105, 111. That end of the driven shaft B which is remote from the adjusting devices 105, 111 carries a bevel gear 133 which can be operatively connected, for example, with a differential.

In order to generate a pressure which is modulated by the torque sensor 114 at least in dependency upon the torque and which is required to tension the infinitely variable speed cone pulley transmission, there is provided a pump 134, $P_1$ which is connected to the plenum chamber 122 of the torque sensor 114 by way of a hollow tube 135 provided in the drive shaft A and having at least two chambers, and at least one radial channel 136. Furthermore, the pump 134 is connected to the plenum chamber 106 of the piston-cylinder unit 105 at the second pair 102 of discs by way of a conduit 137. The connecting conduit 137 communicates with the hollow tube 138 which is provided in the driven shaft B and has at least two chambers defined by partitions or webs and, in turn, communicating with the plenum chamber 106 by way of at least one radial channel 139.

The plenum chamber 122 of the torque sensor 114 is connected with the plenum chamber 109 of the pistoncylinder unit 114 by a channel 140 which is offset relative to the plane of FIG. 1a in a circumferential direction and, therefore, is shown by broken lines. The channel 140 is provided in the annular component 124 which is rigidly connected to the shaft A. Thus, the channel 140 establishes a permanent connection between the first plenum chamber 122 and the plenum chamber 109. The drive shaft A is further provided with at least one fluid evacuating channel 141 which communicates, or which can communicate, with the plenum chamber 122 and the effective cross-sectional area of which can be varied in dependency at least upon the magnitude of the transmitted torque. The evacuating channel 141 communicates with a central bore 142 of the shaft A which bore, in turn, can be connected with a conduit adapted to convey the oil flowing out of the torque sensor 114, e.g., to a suitable location for lubrication of component parts. The axially movable ramps—i.e., the disc cam 119 which is axially movably mounted on the drive shaft A, has an inner portion 126a which constitutes a sealing element cooperating with the evacuating channel 141 in order to seal the evacuating channel 141 to a greater or lesser extent, depending at least upon the magnitude of transmitted torque. Thus, the sealing portion 126a cooperates with the channel 141 to constitute a valve or a flow restrictor. The disc cam 119 acts as a control piston which can open or close the evacuating opening or the evacuating conduit 141 to thus establish in the plenum chamber 122 a pressure generated by the pump 134 and depending at least upon the magnitude of the torque being transmitted between the two disc cams 118, 119. A corresponding pressure is established also in the plenum chambers 109, 106 because the plenum chamber 122 communicates with the plenum chamber 109 and also with the plenum chamber 106 by way of the channels and/or conduits 135, 136, 137, 138 and 139.

Due to parallel connection of the piston-cylinder units 104, 105 with the piston-cylinder units 110, 111, the forces which are being applied to the axially movable flanges 101a, 102a in response to the pressure that is being applied by the torque sensor 114 are added to the forces which act upon the flanges 101a, 102a as a result of the pressure developing in the chambers 112, 113 for the setting of the ratio of the transmission.

The plenum chamber 112 receives pressurized fluid by way of a channel 143 which is provided in the shaft A and communicates with an annular groove 145 of the shaft A by way of a radial bore 144. The annular groove 145 communicates with at least one channel 146 which is provided in the annular component 124 and establishes a connection with a radial port 147 provided in the sieve-like component 121 and discharging into the plenum chamber 112. The plenum chamber 113 is supplied with oil in an analogous manner, namely by way of a channel 148 which surrounds the channel 138 and communicates with the plenum chamber 113 by way of radially extending channels 149. The channels 143 and 148 are supplied with fluid by a common source of pressurized fluid through the intermediary of at least one valve 150 and connecting conduits 151, 152. The source 153 $P_2$ of pressurized fluid which is connected to the valve 150 or system of valves 150, can constitute a discrete pump or it can be constituted by the aforementioned available pump 134; in the latter case, it is necessary to provide a suitable volume- or pressure-distributing system 154 which can comprise several valves. Such alternative solution is indicated by broken lines.

The plenum chamber 123, which is effective in parallel with the plenum chamber 122 when it contains pressurized fluid, is sealed from the source of pressurized fluid when the individual parts of the pair 101 of conical flanges assume the relative positions shown in the upper half of the illustration of this pair; the reason is that the channels, e.g., bores 155, 156, 157, 158, 159, 160, which communicate with the plenum chamber 123, are not connected to a source of pressurized fluid, especially to the pump 134. In view of the position of the axially shiftable flange 101a, the flow of fluid through the radial bore 160 is fully unobstructed so that the chamber 123 is not under pressure. The axial force being applied, for the transmission of torque, from the torque sensor to the disc cams, e.g., disc cam 119 is taken up solely by the pressure cushion which is being built up in the plenum chamber 122. The pressure in the plenum chamber 122 increases in response to the increase of the torque which is being transmitted. As already mentioned above, such pressure is regulated by the portions 126a, which act as a throttle valve, and by the evacuating bore 141.

When the transmission ratio is being changed to a higher value, the conical flange 101a is shifted in a direction to the right toward the conical flange 101b. The effect of such shifting upon the pair 102 of conical flanges is that the conical flange 102a moves axially and away from the axially fixed conical flange 102b. As already mentioned hereinbefore, the upper halves of the representations of the pairs 101, 102 of conical flanges show those positions of the conical flanges 101a, 101b and 102a, 102b relative to each other which correspond to the extreme positions for a shifting of the transmission into a lower gear, whereas the lower halves of these representations show those positions of the conical flanges 110a, 101b and 102a, 102b relative to each other which correspond to the other extreme positions of the conical flanges 110a, 101b and 102a, 102b relative to each other, namely when the transmission is to be shifted into a higher speed.

In order to shift from the transmission ratio shown in the upper halves of representations of the pairs 101, 102 of conical flanges into the transmission ratio shown in the lower halves of the respective representations, the pressure of fluid in the plenum chamber 112 is increased and the plenum chamber 113 is evacuated or its volume is reduced accordingly in response to appropriate regulation of the valve 150.

The axially shiftable conical flanges 101a, 102a are non-rotatably coupled with the corresponding shafts A and B by way of toothed connections 161, 162. The rotation-preventing connections 161, 162, each of which includes an internal gear of the respective conical flange 101a, 102a and an external gear of the respective shaft A, B, permit axial shifting of the conical flanges 101a, 102a along the corresponding shafts A, B.

The dot-dash positions of the axially shiftable conical flange 101a in the upper half of the representation of the driving pair 101 of conical flanges and of the chain 103 correspond to the maximum ratio of the transmission to a higher speed. The dotdash position of the chain 103 at the pair or set 101 of conical flanges corresponds to the solid-line position of the chain 103 at the set 102 of conical flanges.

The dot-dash positions of the axially shiftable conical flange 102a in the lower half of the representation of the driven pair of conical flanges and of the chain 103 correspond to the maximum ratio of the transmission to a lower speed. Such position of the chain 103 corresponds to the solid-line position shown in the upper half of the representation of the first set 101 of conical flanges.

In the illustrated embodiment, the flanges 101a, 102a have radially inner centering portions 163, 164 and 165, 166, respectively by means of which they are mounted and centered directly on the corresponding shafts A and B. The guide portions 163, 164 of the axially shiftable flange 101a are mounted practically without play relative to the external surface of the shaft A and cooperate with the channels 159, 160 to form valves, i.e., the flange 101a actually performs the function of a mobile valving element for the channels 159, 160. When the flange 101a is shifted in a direction to the right from the position shown in the upper half of the representation of the set 101 of flanges, a certain initial stage of such shifting is followed by a stage during which the guide portion 164 gradually seals the channel 160 in response to axial movement of the flange 101a. This means that the guide portion 164 is located radially over the channel 160. In such position of the flange 101a, the radially outer end of the channel 159 is also sealed by the conical flange 101a, namely by the guide portion 163. As the flange 101a continues its axial movement in a direction toward the flange 101b, the channel 160 remains sealed but the flange 101a, and more specifically its guide or regulating portion 163, gradually opens the channel 159. This enables the channel 159 to establish communication between the plenum chamber 109 of the piston-cylinder unit 104 and the channel 158 which, in turn, enables the channels 157, 156 and 155 to establish communication with the plenum chamber 123. Since the channel 160 is practically sealed and the plenum chamber 109 can communicate with the plenum chambers 122 and 123—and if one disregards eventual minor losses due to the flow resistance in the fluid paths—the pressure in the two plenum chambers 122, 123 practically matches that in the plenum chamber 109 as well as that in the chamber 106 which is communicatively connected therewith by way of the channel 135 and the conduits 137, 138. Owing to the transmission ratio-dependent connection between the two plenum chambers 122 and 123, the axially effective surface of the fluid cushion in the torque sensor 114 is increased, namely because, as far as their effect is concerned, the axially effective surfaces of the two plenum chambers 122, 123 are added to each other. The result of such increase of the axially effective supporting surface is that, with reference to a given torque, the pressure being built up by the torque sensor is reduced substantially proportionally with the aforementioned increase of the axially effective surface which, in turn, entails that the fluid pressure in the plenum chambers 109 and 106 is also reduced to the same extent. Thus, the novel torque sensor 114 renders it possible to achieve a modulation of pressure which is dependent upon the transmission ratio and is superimposed upon the torque-dependent modulation of fluid pressure. Actually, the illustrated torque sensor 114 renders it possible to achieve a two-stage modulation of pressure, i.e., the pressure level.

In the illustrated embodiment, the two channels 159, 160 are disposed and designed, with reference to each other and to the cooperating portions 163, 164 of the flange 101a, in such a way that the switchover from one plenum chamber 122 to both plenum chambers 122, 123, or vice versa, takes place at a transmission ratio of approximately 1:1 of the infinitely variable transmission with conical flanges. However, and as already pointed out hereinbefore, the design can be such that the switchover need not take place abruptly, i.e., there can be established a transition zone in which the evacuating channel 160 is already sealed but the connecting channel 159 is yet to communicate with the plenum chamber 109. In order to ensure a satisfactory operation of the transmission, i.e., of the torque sensor 114, in such transition zone, namely to ensure that the disc cam 119 can move axially, there are provided compensating means which permit a volumetric change of the plenum chamber 123 so that the torque sensor 114 is capable of carrying out a pumping action. This means that the parts of the cylinder and the parts of the piston of the torque sensor 114 must be free to move axially relative to each other. In the illustrated embodiment, such compensating means are constituted by a tongue- or lip-seal 167 which is received in a radial groove of the annular component 124 and cooperates with the cylindrical internal surface of the component 125 to seal the plenum chambers 122, 123 from each other. The sealing ring 167 is designed and disposed in such a way that it seals and thus prevents an equalization of pressures between the two chambers 122 and 123 only in one axial direction whereas, in the other axial direction, an equalization of pressures (i.e., the flow of fluid through the seal 167) is possible at least in the presence of a positive pressure differential between the plenum chamber 123 and the plenum chamber 122. Thus, the sealing ring 167 functions in a manner similar to a check valve in that it prevents the flow of fluid from the plenum chamber 122 into the plenum chamber 123 but the fluid can flow through the sealing location established by the sealing ring 167 when the pressure in the plenum chamber 123 exceeds the pressure in the plenum chamber 122 by a certain value. Thus, when the disc cam 119 moves in a direction to the right, pressurized fluid can flow from the sealed plenum chamber 123 into the plenum chamber 122. During a next-following movement of the disc cam 119 in a direction to the left, a subatmospheric pressure can develop in the plenum chamber 123 and it is even possible that the oil in the chamber 123 contains small bubbles of air. However, this does not adversely affect the operation of the torque sensor and/or of the infinitely variable speed transmission with conical flanges.

In lieu of the seal 167 which acts as a check valve, it would be possible to provide a check valve which would operate between the two plenum chambers 122, 123 and which would be installed in the annular component 124. It would then be possible to employ a sealing device 167 which would act in both axial directions. Furthermore, it would be possible to arrange this check valve in such a way that it would act between the channels 135 and 158. This check valve would have to be arranged in a manner such that it would permit a volumetric flow of fluid from the plenum chamber 123 in a direction toward the plenum chamber 122 but the valve would block the flow of fluid in the opposite direction.

The preceding description of the operation indicates that, practically within the entire partial range when the transmission serves as an RPM reducing means (underdrive), the axial force which is being generated at the ball-guiding ramps of the disc cams 118, 119 is taken up only by the axially effective surface which is presented by the plenum chamber 122. On the other hand, practically within the entire portion of the transmission range when the transmission converts to a higher RPM (overdrive), the axial force which is being generated by the ball-guiding ramps of the disc cam 119 is taken up by the combined effective surfaces of the plenum chambers 122, 123. Thus, and assuming the presence of the same input torque, the pressure which is generated by the torque sensor 114 during downshifting of the transmission into a lower speed is higher than that generated by the torque sensor 114 during upshifting of the transmission into a higher speed. As already pointed out hereinbefore, the illustrated transmission is designed in such a way that the switchover point which effects the establishment or termination of communication between the plenum chambers 122, 123 is located in the region of the transmission ratio of 1:1. However, by resorting to an appropriate layout and an appropriate design of the channels 159, 160 of the conical flange 101*a* (which portions cooperate with the channels), the switchover point or the switchover range can be shifted accordingly within the entire range of the infinitely variable speed transmission with conical flanges.

The establishment or interruption of communication between the two plenum chambers 122, 123 can also take place by way of a special valve which is provided for such purpose and can be installed in the region of a channel connecting the two plenum chambers 122, 123 to each other. Such valve need not be actuatable directly by the flange 101*a* or 102*a* but rather, for example, by an external energy source. To this end, one can employ, for example, an electromagnetically, hydraulically or pneumatically actuatable valve which can be operated in dependency upon the transmission ratio or change of ratio of the transmission. For example, one can resort to a so-called 3/2 valve which establishes communication between or seals the plenum chambers 122, 123 from each other. However, it is also possible to employ pressure-responsive valves. A corresponding valve could be provided in the region of a conduit connecting the channels 135 and 158 with each other; in such instance, the channels 159, 160 are sealed or omitted. The corresponding valve is set up or connected in such a way that, when the plenum chambers 122, 123 are sealed from each other, the valve relieves the pressure in the plenum chamber 123. To this end, the valve can be connected with a conduit leading back to the oil sump.

If one employs a valve which is regulatable from without, such valve can be actuated in dependency upon other or additional parameters. For example, such valve can also be regulated in dependency upon surges of torque which develop in actual use of the transmission. In this manner, one can prevent or at least reduce the likelihood of slippage of the chain, at least under certain circumstances of use, i.e., during certain ratios of the infinitely variable speed transmission.

In the embodiment which is shown in FIGS. 1*a* and 1*b*, the torque sensor 114 is installed at the input side adjacent the axially shiftable conical flange 101*a*. However, the torque sensor 114 can be installed, and adapted accordingly, at any desired location in the torque transmitting path. Thus, and as already known per se, a torque sensor 114 can also be installed at the output side, for example, on the driven or output shaft B. Such a torque sensor can be installed—in a manner analogos to the mounting of he torque sensor 114—adjacent the axially shiftable conical flange 102*a*. Furthermore, and as also known per se, it is possible to employ several torque sensors. For example, suitable torque sensors can be disposed at the input and output sides.

In addition, the novel torque sensor 114 with at least two plenum chambers 122, 123 can be combined with other devices which are known per se and enable the torque sensor to effect a torque-dependent and/or transmission ratio-dependent pressure modulation. For example, and in a manner similar to that described in DE-OS 42 34 294 or in the corresponding U.S. Pat. No. 5,295,915, the rolling elements 120 could be shiftable in a radial direction along cooperating rolling movement permitting ramps or paths in dependency upon changes of the transmission ratio. The invention further relates to the earlier German patent application No. DE-OS 42 34 294 and U.S. Pat. No. 5,295,915 the disclosures of which are also specifically incorporated herein by reference and form part of the present specification.

In that described embodiment which is shown in FIG. 1*a*, the plenum chamber 106 is connected with the torque sensor 114. However, it is also possible to apply the pressure supplied by the torque sensor 114 to the outer plenum chamber 113; the inner plenum chamber 106 then serves to effect changes of transmission ratio. To this end, it is merely necessary to alternate or to interchange the connections of the two conduits 152 and 137 at the second set 102 of conical flanges.

In that embodiment of the torque sensor 114 which is shown in FIG. 1*a*, its component parts are made predominantly of sheet metal. This applies primarily for the disc cams 118 and 119 which can constitute shaped sheet metal components, e.g., embossed parts. In order to regulate the pressure in the individual chambers, it might be advisable to provide discrete valves $V_1$ which receive pressurized fluid from a pump $P_I$ by way of hydraulic conduits 90 (FIG. 1)

FIG. 2 shows in section a pair 200 of conical flanges including an axially fixed first conical flange 201 and an axially shiftable second conical flange 202. The axially fixed conical flange is of one piece with or integral with the shaft 203. The axially shiftable conical disc or flange 202 is axially movably mounted on the shaft 203 but is form-lockingly connected with the latter, for example, by means of internal teeth in the cam disc and external teeth on the shaft.

The shaft 203 comprises a centrally located axially extending bore 210 from which extend radially extending connecting bores 211 to 215 provided in the shaft 203 in various axial positions. The bore 210 receives a hollow tube 220 which is divided into various chambers by way of at least a few axially extending partitions or webs. This is shown in FIGS. 3*a* to 3*e* in sectional views as seen from the line X—X.

FIGS. 3*a* to 3*e* show advantageous modifications of the hollow tube 220 in a cross-sectional view.

Figure 3A:
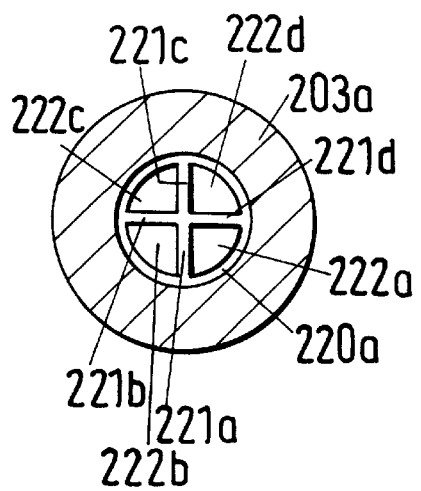
FIGS. 3a to 3e show sectional views of various embodiments of a hollow tube according to the invention taken along line X—X of FIG. 2, and FIG. 4 a sectional view of a pair of conical flanges according to an embodiment of the invention.

FIG. 3*a* shows a shaft 203*a* having a central axial bore 210. This bore receives a hollow tube 220*a* which is subdivided into four chambers or compartments 222*a*, 222*b*, 222c and 222d by partitions or webs 221a, 221b, 221c and 221d. The partitions extend from the central point or from the axis of the bore 210 radially outwardly and are disposed essentially at right angles to each other.

Figure 3B:
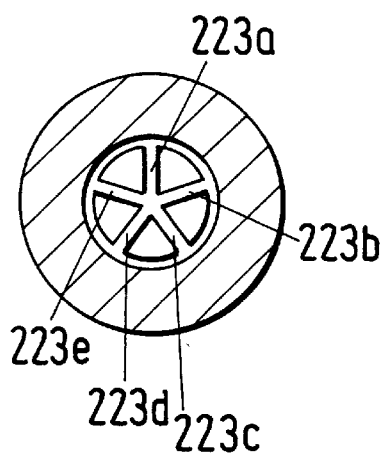
Figure 3C:
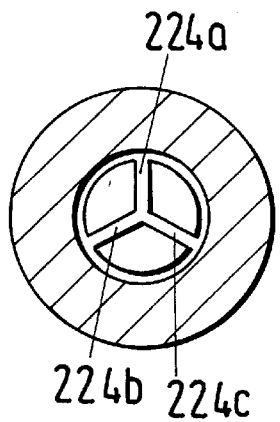
Figure 3D:
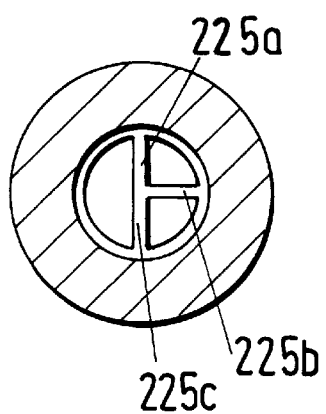
Figure 3E:
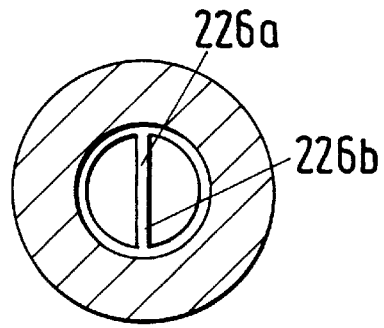

In contrast thereto, FIG. 3b illustrates an embodiment with five partitions 223a, 223b, 223c, 223d and 223e which are in a star-shaped formation and extend radially outwardly from the central point or axis. This results in the formation of five chambers or compartments which are disposed between the partitions and the wall of the tube and which may but not have identical sizes depending upon the angles between neighboring partitions. FIG. 3c illustrates an embodiment wherein three compartments are formed with three partitions 224a, 224b, 224c. FIG. 3d illustrates an embodiment wherein three compartments are formed with three partitions 225a, 225b, 225c. The compartments of FIG. 3c have equal sizes whereas, in FIG. 3d, two compartments have equal sizes and the third compartment is larger than the other two. Basically, the size of the larger compartment at least approximates the combined size of the other two compartments. FIG. 3e illustrates an embodiment wherein two compartments are defined by two partitions 226a and 226b. It is also possible to replace these two partitions with a single partition having a size twice that of the partition 226a or 226b. It is also possible to install the two partitions 226a, 226b at an angle other than 180 degrees.

It can be of advantage to make the partitions of one piece with or to connect them to the hollow tube. It is desirable to make the hollow tube and the partitions of a synthetic plastic material, aluminum or another material having a heat expansion coefficient equal to or greater than the material, such as steel, of the shaft 203. This entails that, as the temperature of oil flowing through the tube rises, the dimensions of the clearances undergo a progressing reduction. It is also possible to make the hollow tube of a material which at least partially absorbs fluids, such as hydraulic oil, with attendant increase of its volume. It is preferred that absorption of fluid brings about a volumetric increase in the range of between 1 and 10 percent.

Radial distribution of the partitions brings about the advantage that it enhances the stability of the shaft.

Different configurations of the compartments can be arrived at by altering the orientation of the partitions, for example, by resorting to partitions which are parallel to each other.

Figure 4:
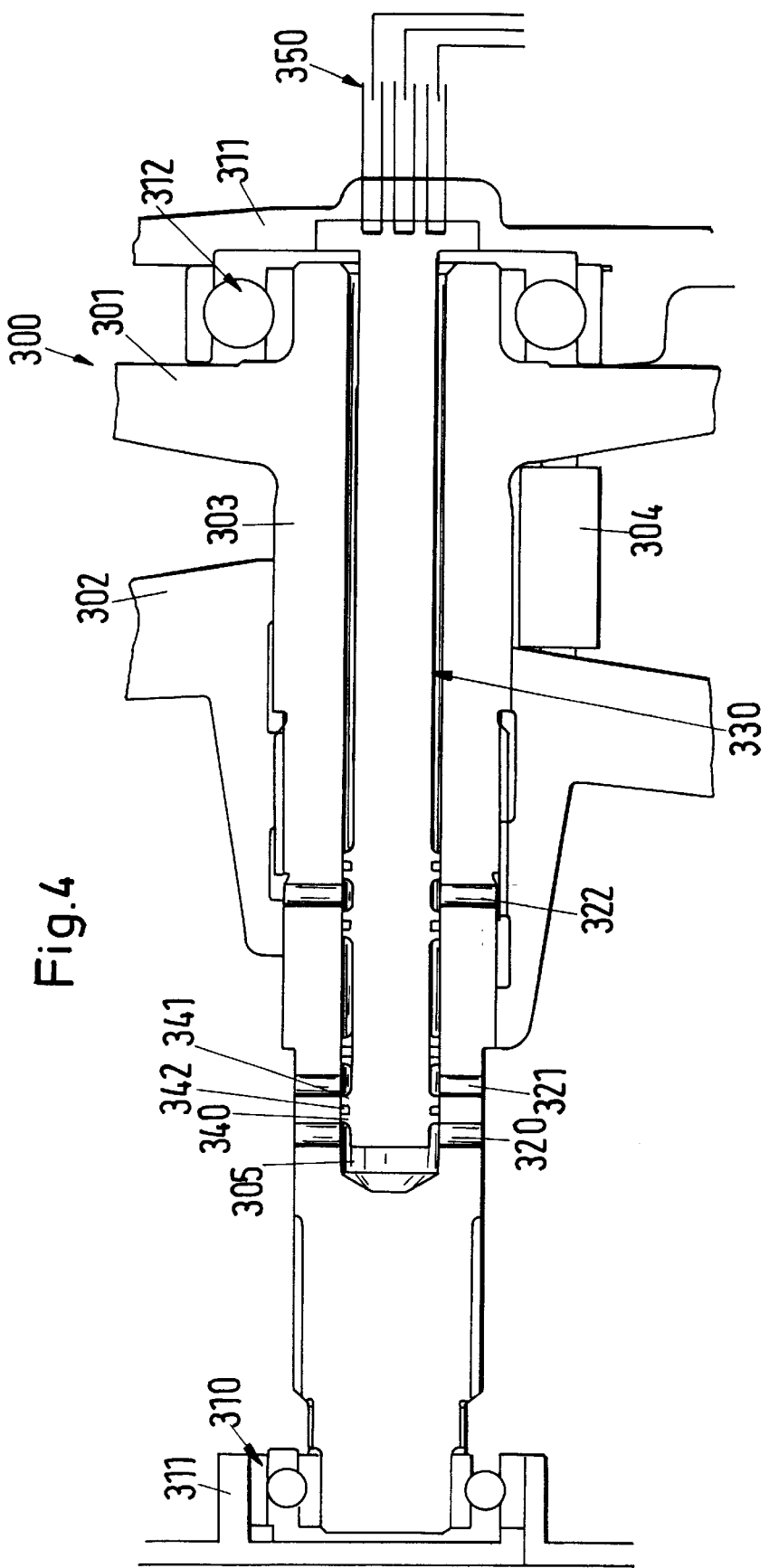

FIG. 4 is a sectional view of set (pulley) 300 of two conical flanges including an axially fixed conical flange 301 and an axially movable conical flange 302. The axially fixed conical flange is of one piece with or integrally connected to the shaft 303. The axially movable conical flange 302 is mounted for axial movement along the shaft 303 but is form-lockingly affixed to the shaft against rotation, for example, by resorting to external teeth on the shaft and to complementary internal teeth on the flange 302. There is further shown an enwrapping means 304, such as a chain. The shaft 303 is rotatably mounted in a housing 311 by means of bearings 310 and 312.

The shaft 303 has a centrally located axially extending bore 305 from which extend radially outwardly connecting bores 320 to 322, e.g., drilled bores, in different axial positions. The bore 305 receives a hollow tube 330 the interior of which is subdivided into axially extending compartments by means of at least two axially extending partitions. For example, the compartments can be formed and configurated in a manner as described with reference to FIGS. 3a to 3e.

At least one end portion of the hollow tube is non-rotatably mounted in the housing and receives pressurized fluid by way of ports. Individual compartments of the hollow tube receive pressurized fluid by way of different ports.

The hollow tube 330 has bores or apertures in communication with those compartments which respectively communicate with the connecting bores 320, 321 and 322. For adequate sealing of discrete bores, the external surface of the hollow tube 330 is provided with pairs of spaced-apart annular grooves 340, 341 flanking a sealing ring serving to seal between the external surface of the hollow tube and the surface bounding the bore 305. For example, two seals can be sealingly installed to the left and to the right of each of the connecting bores 321 and 322, as seen in the axial direction of shaft. The connecting bore 320 is sealed by a single seal 342 because it communicates for example with an end portion of the bore 305 and an open axial end zone. If the bore 305 is dimensioned to extend all the way through the entire shaft, the connecting bore 320 is also flanked by two sealing elements.

The annular grooves can be formed by projections provided on the hollow tube or as a result of the provision of ring-shaped elements which are affixed to the external surface of the hollow tube.

The sealing elements are subject to rotation of the shaft and tube when the transmission is in use and are capable of sealing even when at least one of the parts including the shaft and the hollow tube rotates.

It is of advantage if the shaft of the set of conical flanges or, in another embodiment, a different transmission shaft, constitutes a shaft which has an axial bore not extending all the way from the one to the other of its ends.

In accordance with another embodiment, it is of advantage if the shaft for a pair of conical flanges or, in a different embodiment, another shaft of the transmission, constitutes a shaft having a through bore from end to end.

The patent claims which have been filed with the application are formulation proposals without prejudicing the acquisition of broader patent protection. Applicant reserves the right to claim also additional features which, at this time, are disclosed only in the specification and/or in the drawings.

The references made in the dependent claims direct attention to the matter of the independent claims in accordance with the characteristics called for in the respective dependent claim; they are not to be interpreted as a waiver of the acquisition of an independent substantive protection for the characteristics of the dependent claims being referred to.

However, the matter of such dependent claims also constitutes independent inventions not affected by the subject matter called for in the preceding dependent claims.

Furthermore, the invention is not limited to the described embodiment(s). On the contrary, it is possible to carry out, within the framework of the invention, numerous changes and modifications, particularly those modifications, elements and combinations and/or materials which are novel, for example, by combining or modifying individual features and/or elements or method steps heretofore pointed out only in the general description and in the claims and shown in the drawings and which, as a result of combinations of features, lead to a novel product or to novel method steps or series of method steps, also as concerns the making, testing and operating procedures.

What is claimed is:

1. Transmission comprising at least one shaft and adjusting elements operable by a pressurized medium, at least one of said at least one shaft having a cavity extending along at least a portion of an axial length thereof for receiving a hollow tube for supplying at least one of said adjusting elements with said pressurized medium, said hollow tube having at least one axially extending web dividing the cross section of said hollow tube into axially-extending chambers.

2. A continuously variable speed cone pulley transmission disposed in a motor vehicle in a power flow between a driving unit and at least one wheel comprising an input shaft, an output shaft, a starting element, an element for reversing direction of rotation, a first set of flanges disposed on a first shaft comprising an axially-fixed conical flange and an axially shiftable conical flange, a second set of flanges disposed on a second shaft comprising an axially-fixed conical flange and an axially shiftable conical flange, wrapping means for transmission of torque between said first set and said second set of flanges, a torque sensor, and at least said axially shiftable concial flanges including adjusting elements for the application of pressure thereto, wherein at least one of said first and second shafts has a cavity extending axially along at least a portion thereof for receiving a hollow tube for supplying at least one of said adjusting elements with pressurized medium, said hollow tube having at least one axially extending web dividing the cross section thereof into axially-extending chambers.

3. Transmission according to claims 1 or 2, wherein said adjusting elements are adapted to be supplied with said pressurized medium by bores extending substantially radially into said cavity and into said hollow tube.

4. Transmission according to claims 1 or 2, wherein said hollow tube has a axially-extending web forming two chambers.

5. Transmission according to claims 1 or 2, further comprising a housing, wherein said hollow tube is non-rotatably connected with said at least one of said at least one shaft and an axial end portion of said hollow tube is journalled for rotation relative to said housing.

6. Transmission according to claim 5, further comprising an at least substantially fluid-tight connection between said hollow tube and said housing element during said relative rotation.

7. Transmission according to claim 6, wherein said hollow tube further includes seals on its external surface for sealing areas thereof and said sealed areas have bores for conveying said pressurized medium from said chambers.

8. Transmission according to claims 1 or 2, further comprising a housing and a housing element rigidly connected thereto, wherein said hollow tube is non-rotatably connected with said at least one of said at least one shaft and an axial end portion of said hollow tube is journalled for rotation relative to said housing element.

9. Transmission according to claims 1 or 2, further comprising a housing, wherein said hollow tube is non-rotatably disposed relative to said housing and said at least one of said at least one shaft is adapted to rotate relative to said hollow tube.

10. Transmission disposed in a motor vehicle in a power flow between a driving unit and at least one wheel comprising an input shaft, an output shaft, a starting element, an element for reversing direction of rotation, a first set of flanges disposed on a first shaft comprising an axially-fixed conical flange and an axially shiftable conical flange, a second set of flanges disposed on a second shaft comprising an axially-fixed conical flange and an axially shiftable conical flange, wrapping means for transmission of torque between said first set and said second set of flanges, a torque sensor, and at least said axially shiftable concial flanges including adjusting elements for the application of pressure thereto.

* * * * *